United States Patent
Yang

(10) Patent No.: US 8,077,149 B2
(45) Date of Patent: Dec. 13, 2011

(54) COMPUTER MOUSE WITH RETRACTABLE CABLE INCLUDING A CIRCUIT BOARD WITHIN A CABLE REELING DEVICE

(75) Inventor: Hsien-Lin Yang, Taipei (TW)

(73) Assignee: Kui-Hsien Huang, Taipei (TW)

( * ) Notice: Subject to any disclaimer, the term of this patent is extended or adjusted under 35 U.S.C. 154(b) by 626 days.

(21) Appl. No.: 12/247,239

(22) Filed: Oct. 8, 2008

(65) Prior Publication Data

US 2010/0085305 A1   Apr. 8, 2010

(51) Int. Cl.
*G09G 5/08*   (2006.01)

(52) U.S. Cl. ........................................ 345/163

(58) Field of Classification Search .......... 345/163–166; 242/378.1
See application file for complete search history.

(56) References Cited

U.S. PATENT DOCUMENTS

| | | | |
|---|---|---|---|
| 6,452,586 B1 * | 9/2002 | Holmdahl et al. | 345/163 |
| 6,871,812 B1 * | 3/2005 | Chang | 242/378.1 |
| 6,988,687 B2 * | 1/2006 | Huang | 242/385 |

* cited by examiner

*Primary Examiner* — Chanh Nguyen
*Assistant Examiner* — James Nokham
(74) *Attorney, Agent, or Firm* — Leong C. Lei

(57) ABSTRACT

A computer mouse with retractable cable is disclosed. The internal of the computer mouse contains coil spring, reeling disc, positioning bead and conductors. The lead wire once pulls, it is positioned and a second pull will restore back to its original position. The pulling of lead wire controls the required length of the mouse.

3 Claims, 6 Drawing Sheets

COMPUTER MOUSE WITH RETRACTABLE CABLE INCLUDING A CIRCUIT BOARD WITHIN A CABLE REELING DEVICE

TECHNICAL FIELD OF THE INVENTION

The present invention relates to retractable cable mounted to a computer mouse, and in particular, a reeling device contained in the mouse to allow the retraction of cable.

DESCRIPTION OF THE PRIOR ART

U.S. Pat. No. 6,871,812 discloses a retractable coiling cord device comprising a front cover, a spiral spring, a sliding disc, a retraction cord, a positioning bead and a rear cover, characterized in that the front cover having an inner edge with a center shaft for engaging the center end of the spiral spring is mounted with the rear cover using a screw nut via a center hole of the sliding disc; the spiral spring is positioned within a front edge seat of the sliding disc and has a center end to engage with a center shaft of the front cover and a bending section at the outer edge end of the spiral spring is positioned at a circumferential wall of the front edge seat so that the spiral spring is restricted between the front cover and the sliding disc.

Conventional reeling device connected to a mouse employs steel bead to stop or to position cable, and the bottom section of the rotating disc is provided with mechanic rail so that steel bead can roll on the rail, thus the cable is engaged to position or is disengaged.

Conventional reeling device has the following drawbacks.

1) The steel bead or the rail may be worn after a period of use.

2) The position of cable depends on the precise combination of the steel bead and the rail.

3) The spare cable within the conventional reeling device requires cost in manufacturing.

Accordingly, it is an object of the present invention to provide a computer mouse with retractable cable which mitigates the drawbacks.

SUMMARY OF THE INVENTION

Accordingly, it is an object of the present invention to provide a computer mouse with retractable cable comprising a cable reeling device mounted within the mouse and connected to a signal end of the mouse, wherein the reeling device comprises a top cover, a coil spring, a rotating disc, a positioning bead, a lead wire, a circuit board and a bottom cover, wherein the top cover passes through a middle hole of the rotating disc and mounts onto a slot at a securing seat at the bottom cover, and the center shaft of the top cover has an opening slot for engagement with the center end of the coil spring; the coil spring is located at a space within the top frame of the rotating disc and the center end thereof is positioned at the opening slot of the center shaft of the top cover, and the external end of the coil spring is engaged at the engaging slot at the wall of the rotating disc using an edge hook such that the coil spring can rotate clockwise or anti-clockwise forming into a tight or released state and provide a force to retract the changing lead wire; the rotating disc has a center hole allowing the center shaft to pass through and includes a top frame, a disc slot and a bottom frame, the space formed by the top frame is for the mounting of the coil spring, and the disc slot formed between the top frame and the bottom frame allows the lead wire to rotate, the space formed by the bottom frame is allowed to place the positive and negative conductive plate, and is provided with fixed slot for lead wire, the bottom of the frame is a recess which has a number of railing slots, and the railing slot has a limiting end which in combination with the securing seat of the bottom cover forming into a covering and limiting structure, the positioning bead is positioned at a limiting slot formed by the railing structure and the bottom cover securing base seat such that the positioning bead can only be secured at the positioning slot of the securing base seat and allows reciprocating movement; the lead wire which surrounds the disc slot of the rotating disc and has an initial end passing through the space of the bottom frame of the rotating disc and is secured at a lead wire securing slot and is extended out from a slot opening; forming a positive and negative end which are respectively connected to the positive and negative conductive plate; forming into a main connection of the current source; the circuit board is positioned at the securing base seat and has a positive and negative coil respectively corresponds to the positive and negative conductive plate, forming into a permanent compress connection; and the bottom cover is protrudingly mounted to the securing base seat for the positioning of the circuit board, and the base seat provides the space for mounting of the recess of the bottom frame of the rotating disc and also provides a limiting slot, and the center has an opening slot for the positioning of the center shaft of the top cover.

Yet still another object of the present invention to provide a computer mouse with retractable cable, wherein the positive and negative electrode conductive elastic plates are not positioned in concentric circle.

Still yet another object of the present invention is to provide a computer mouse with retractable cable, wherein the top and bottom cover are directed to the coil spring, the rotating disc, the positioning bead, the lead wire and the circuit board of the mouse.

Other objects, and advantages will become more apparent in view of the following detailed description in conjunction with the accompanying drawings.

DETAILED DESCRIPTION OF THE PREFERRED EMBODIMENTS

Figure 1:
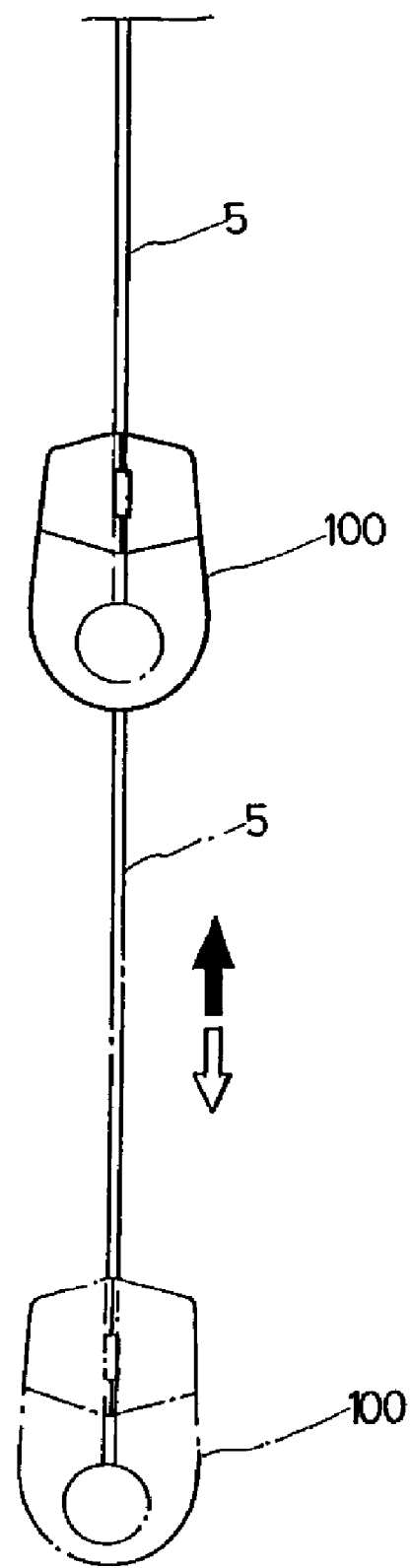
FIG. 1 shows schematic view of the lead wire in retraction of the present invention.
Figure 2:
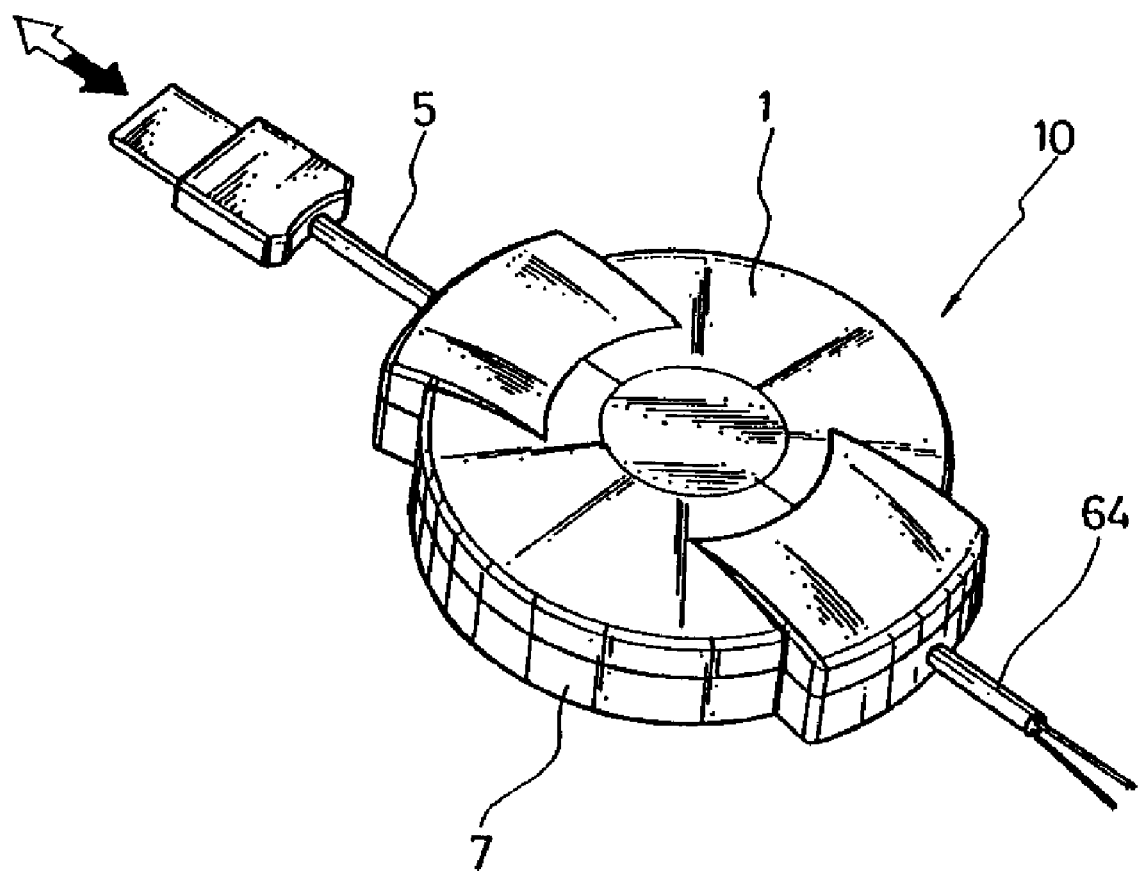
FIG. 2 is a schematic view showing the reeling device within the mouse of the present invention.
Figure 3:
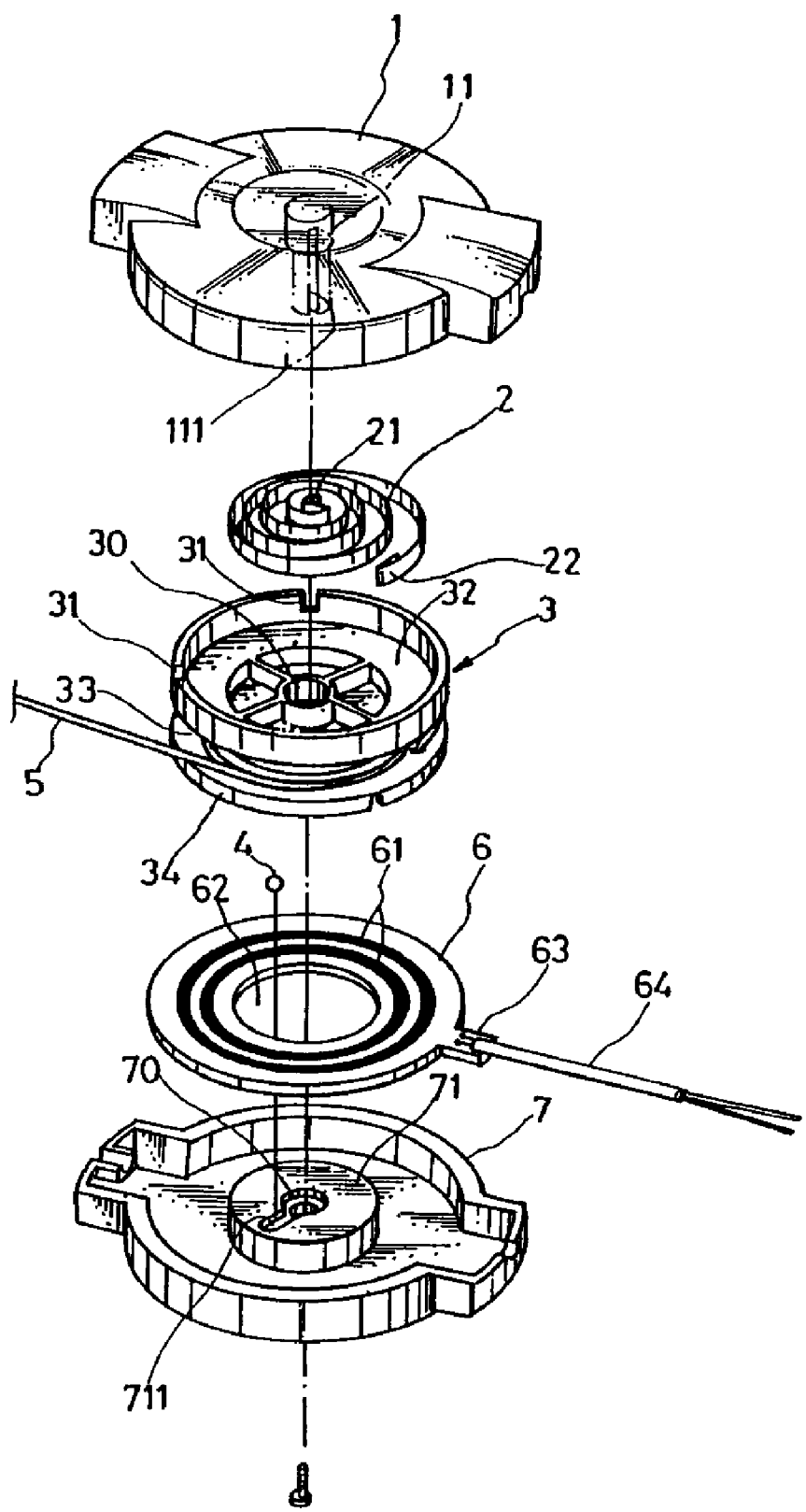
FIG. 3 is an exploded schematic view showing the components of the reeling device within the interior of the mouse of the present invention.

Referring to FIG. 1, the mouse 100 contains a single direction reeling device. As shown in FIGS. 2 and 3, the interior of the mouse 100 has a reeling device 10 having a lead wire or cable 5 which is retractable. The reeling device 10 comprises a top cover 1, a coil spring 2, a rotating disc 3, a positioning bead 4, lead wire 5, a circuit board 6 and a bottom cover 7. The center end 21 of the coil spring 1 is engaged to an opened slot 11 on the center shaft 11 of the top cover 1. The outer end of the coil spring has a hook 22 to be mounted at an engaging slot 31 of the rotating disc 3 such that the coil spring 2 can provide a tightening or releasing state depending or clockwise or anti-clockwise rotation, thus, this will provide dynamic power to retract or release the wire 5.

Figure 4:
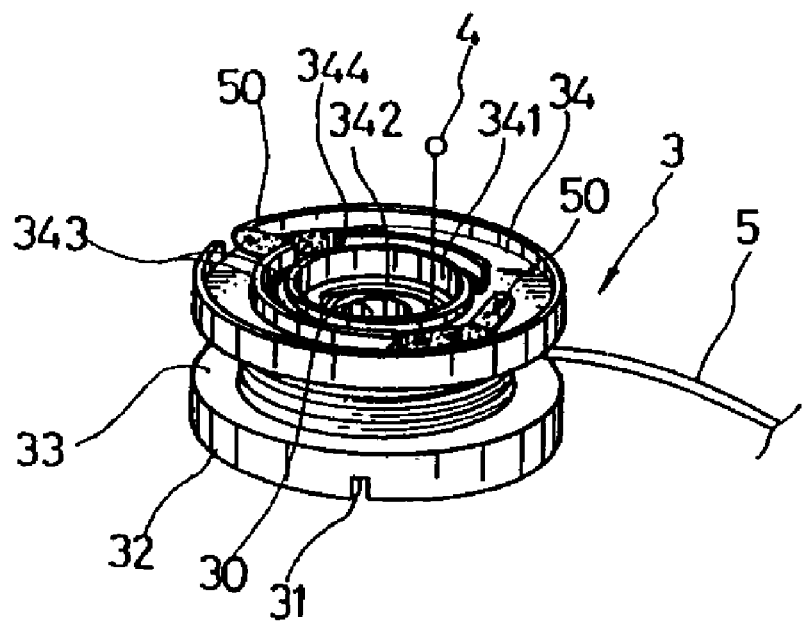
FIG. 4 is an exploded view of the reverse mounted rotating disc of the present invention.
Figure 5:
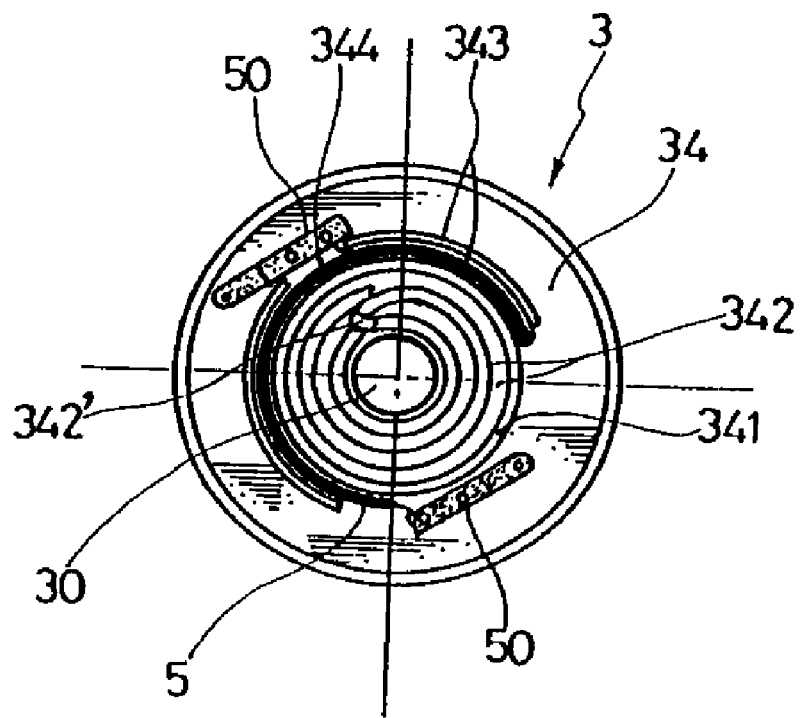
FIG. 5 is a schematic view of the reverse mounted rotating disc of the present invention.
Figure 6:
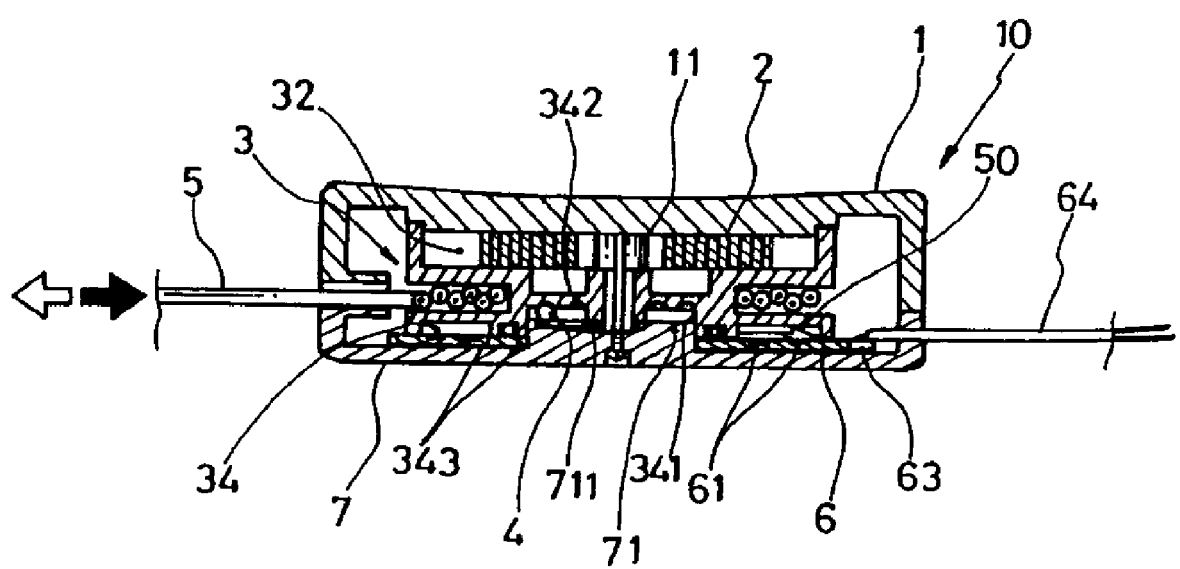
FIG. 6 is a schematic view showing the reeling device of the present invention.

Referring to FIGS. 4 to 6, the rotating disc 3 comprises a top frame 32, a disc slot 33 and a bottom frame 34. The space formed within the top frame 32 is used for the retraction and tightening of the coil spring 2. The slot space 33 formed between the top frame 32 and the bottom frame 4 provides a space for the lead wire 5 to surround. The space formed by the bottom frame 34 contains the positive and negative electrode conductive spring plate 50, and the securing base seat 71, such that the positioning bead 4 between the rail structure 342 and the securing base seat 71. Thus, a special protection structure is obtained, and provides the stability of operation, as shown in FIGS. 3 and 6.

As shown in FIGS. 3 and 5, the center shaft 11 passes through the center hole 30 of the rotating disc, and the center shaft 11 is mounted at the securing slot 70 provided at the base seat 71. Thus, the center shaft 11 has a strong support and allows the rotating disc 3 to stably rotate in clockwise and anti-clockwise direction. The rail structure 342 has multiple slots with a limiting end 342', and the positioning bead 4 is provided at the limiting slot 711 of the securing base seat 71, such that when the positioning bead 4 is in operation, it is only located in the limiting slot 711 to provide reciprocation movement. Thus, when the lead wire 5 is pulled the rotating disc 3 once, the limiting end 3742' and the limiting slot 711 are alternately operated once to provide positioning. If the lead wire 5 being pulled is exceeding the positioning mechanism then the next rotation of the rotating disc 3 will be the positioning mechanism. Thus the lead wire 5 of the reeling device 10 provides a multiple positioning.

As shown in FIGS. 3 and 5, the lead wire 5 is first passing through the space of the bottom frame 34 and is fastened at the lead wire securing slot 343. The lead wire 5 via the slot opening 344 is then connected to the positive and negative electrode conductive elastic plate 50. The positive and negative electrode conductive elastic plate 50 is not positioned art concentric circle. Thus, the positive and negative electrode loop 61 which form the permanent pressing contact will not affect the retraction or loosening of the lead wire 5, which means that the power source or signal are maintained in communication.

Referring to FIG. 3 and FIG. 6, the circuit board 6 is provided with a pivot slot 62, which pivotally mounted onto the securing base seat 71, and the positive and negative loop correspond to the positive and negative conductive elastic plate in permanent contact.

Figure 7:
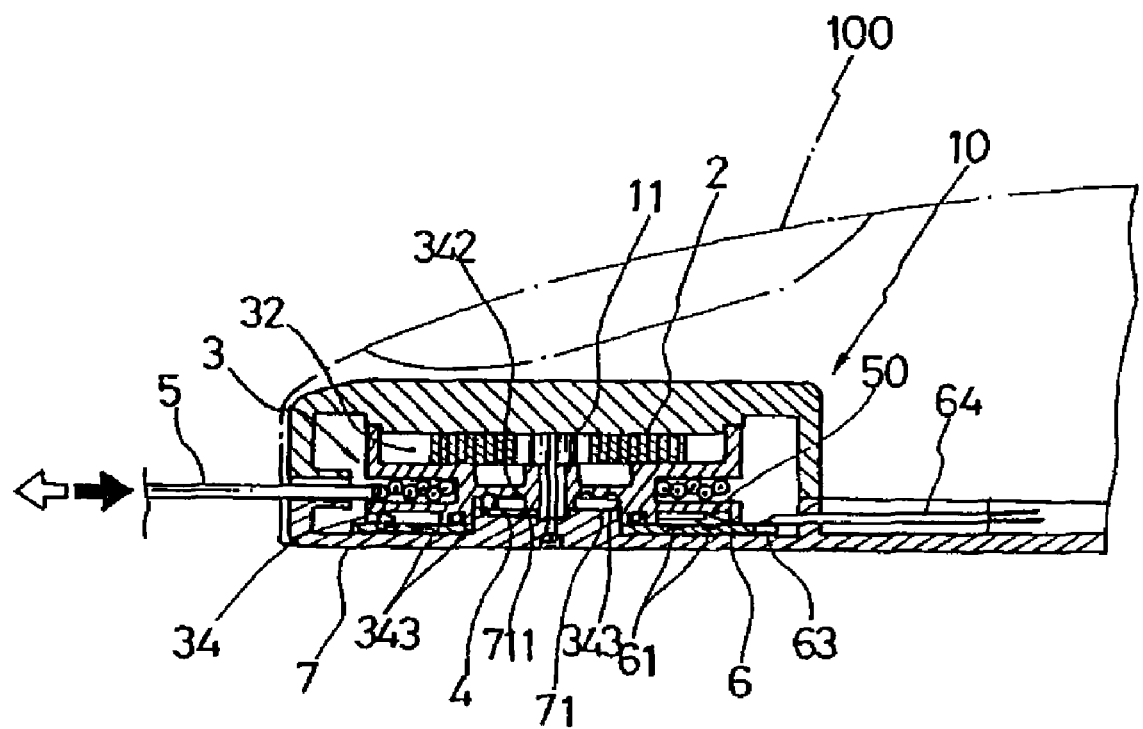
FIG. 7 is a schematic view of another preferred embodiment of the present invention.

As shown in FIG. 7, the reeling device, in another preferred embodiment comprises a spring 2, a rotating disc 3, a positioning bead, a lead wire 5 and a circuit board 6 mounted within the interior of the mouse.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A computer mouse with retractable cable comprising a cable reeling device mounted within the mouse and connected to a signal end of the mouse, wherein the reeling device comprises a top cover, a coil spring, a rotating disc, a positioning bead, a lead wire, a circuit board and a bottom cover, wherein the top cover passes through a middle hole of the rotating disc and mounts onto a slot at a securing seat at the bottom cover, and the center shaft of the top cover has an opening slot for engagement with the center end of the coil spring;

the coil spring is located at a space within the top frame of the rotating disc and the center end thereof is positioned at the opening slot of the center shaft of the top cover; and the external end of the coil spring is engaged at the engaging slot at the wall of the rotating disc using an edge hook such that the coil spring can rotate clockwise or anti-clockwise forming into a tight or released state and provide a force to retract the changing lead wire;

the rotating disc has a center hole allowing the center shaft to pass through and includes a top frame, a disc slot and a bottom frame, the space formed by the top frame is for the mounting of the coil spring, and the disc slot formed between the top frame and the bottom frame allows the lead wire to rotate, the space formed by the bottom frame is allowed to place the positive and negative conductive plate, and is provided with fixed slot for lead wire, the bottom of the frame is a recess which has a number of railing slots, and the railing slot has a limiting end which in combination with the securing seat of the bottom cover forming into a covering and limiting structure;

the positioning bead is positioned at a limiting slot formed by the railing structure and the bottom cover securing base seat such that the positioning bead can only be secured at the positioning slot of the securing base seat and allows reciprocating movement;

the lead wire which surrounds the disc slot of the rotating disc and has an initial end passing through the space of the bottom frame of the rotating disc and is secured at a lead wire securing slot and is extended out from a slot opening;

a positive and negative end which are respectively connected to the positive and negative conductive plate; forming into a main connection of a current source;

the circuit board is positioned at the securing base seat and has a positive and negative coil respectively corresponds to the positive and negative conductive plate, forming into a permanent compress connection; and the bottom cover is protrudingly mounted to the securing base seat for the positioning of the circuit board, and the base seat provides the space for mounting of the recess of the bottom frame of the rotating disc and also provides a limiting slot, and the center has an opening slot for the positioning of the center shaft of the top cover.

2. The computer mouse of claim 1, wherein the positive and negative electrode conductive elastic plates are not positioned in concentric circle.

3. The computer mouse of claim 1, wherein the top and bottom cover are directed to the coil spring, the rotating disc, the positioning bead, the lead wire and the circuit board of the mouse.

* * * * *